Patented Oct. 31, 1950

2,527,808

UNITED STATES PATENT OFFICE 2,527,808

ORGANOSILOXANES

John T. Goodwin, Jr., Midland, Mich., assignor to Dow Corning Corporation, Midland, Mich., a corporation of Michigan No Drawing. Application March 19, 1949, Serial No. 82,476

9 Claims. (Cl. 260—448.2)

The present invention relates to the production of polymeric organosilicon compositions.

The present organosilicon industry is based upon siloxanes which are materials in which the silicon atoms are linked by oxygen atoms. In another type of silicon compound the silicon atoms are linked directly to each other. In a third type the silicon atoms are linked by organic radicals.

Objects of the present invention are to produce polymeric organosilicon compounds in which some pairs of silicon atoms are linked by methylene radicals and others by oxygen atoms. Other objects and advantages of the present invention will be apparent from the following description and the subjoined claims.

In accordance with the process of the present invention, organosilicon compositions are produced by the hydrolysis and condensation of compounds of the type $R(R_2SiCH_2)_nSiRY_2$, where each R is a hydrocarbon radical of the group consisting of alkyl radicals such as methyl to octadecyl and monocyclic aryl radicals, such as phenyl, tolyl and xylyl, and Y is a substituent of the group consisting of alkoxy radicals and halogen atoms. These compositions contain both methylene radicals and oxygen atoms linking the silicon atoms.

The products obtained by the hydrolysis and condensation in accord herewith are fluids. They are polymers, the polymeric units of which consist of units of the type $$[R(R_2SiCH_2)_mSiRO-]$$

in which each R is a radical of the group consisting of alkyl and monocyclicaryl radicals and $m$ is an integer having a value of from 1 to 2 inclusive. Where the compounds contain 3 of these units both cis and trans isomers have been obtained. As is well known from the chemistry of the difunctional siloxanes, these materials hereof may be cyclic or linear polymers.

The intermediate in the case of $(CH_3)_3SiCH_2SiCH_3(OC_2H_5)_2$ may be prepared by reacting the compound $ClCH_2SiCH_3(OC_2H_5)_2$ and the compound $(CH_3)_3SiCl$ in liquid phase by contacting the former with an alkali metal in the presence of the latter compound. If the intermediate $CH_3[(CH_3)_2SiCH_2]_2SiCH_3(OC_2H_5)_2$ is desired, it may be prepared by reacting the compound $ClCH_2SiCH_3(OC_2H_5)_2$ and the compound $(CH_3)_3SiCH_2Si(CH_3)_2Cl$ by contacting the former with an alkali metal in the presence of the latter compound.

The intermediates of the type $R_3SiCH_2SiRX_2$, hydrolyzed and condensed in accord herewith, may also be prepared by reacting a compound of the type $X_2RSiCH_2SiRX_2$ in liquid phase with a Grignard reagent of the type RMgX in which each R represents a radical of the group consisting of alkyl and monocyclicaryl radicals and each X represents a halogen atom.

The methods of preparing the intermediates are claimed in my copending application, Serial Number 82,480, now U. S. Patent 2,507,520, filed simultaneously herewith.

The intermediates, either with or without purification to separate the salt, may be hydrolyzed by mixing with water. No catalyst need be used to prepare the polymers in accord herewith. If desired, an acid or alkaline catalyst may be used. The direct product of the hydrolysis is the silanol, but this condenses readily upon standing to produce the polymers in accord herewith.

The polymers produced by the hydrolysis and condensation hereof are of a wide range of utility. They are of utility for such purposes as hydrophobing agents, lubricants, hydraulic fluids, heat transfer media, and thermal expansion regulator fluids, and are of greater stability than siloxanes free of methylene linkages.

The following examples illustrate the method of the present invention.

Example 1

A mixture of 80 parts by weight of $(CH_3)_3SiCH_2SiCH_3(OC_2H_5)_2$ 63.9 parts of 95 percent ethyl alcohol, and 100.79 parts of 35% HCl was refluxed for 20 hours. The acid-aqueous alcohol layer was drawn off, and the hydrolyzate washed with water, dried, filtered, and distilled. Upon distillation, 21.05 parts of a fluid identified as $[(CH_3)_3SiCH_2SiCH_2SiCH_3O-]_3$ was obtained. This compound has a boiling point of 181° at 24 mm., a refractive index of 1.4391 at 25° C., a density of 0.9151 at 25° C. and a specific refraction of 0.2870. Distillation also yielded 23.48 parts of a fluid which was identified as $[(CH_3)_3SiCH_2SiCH_3O-]_4$ This compound has a boiling point of 223° C. at 24 mm., a refractive index of 1.4452 at 25° C., a density of 0.9390 at 25° C., and a specific refraction of 0.2870.

Example 2

A mixture of 57 parts by weight of $$CH_3[(CH_3)_2SiCH_2]_2SiCH_3(OC_2H_5)_2$$

and 72.5 parts of 10% (vol.) $H_2SO_4$ was refluxed for 6 hours. The acid-water layer was drawn off and the hydrolyzate washed with water, dried over $Na_2CO_3$, and filtered. Distillation yielded 23.02 parts of a fluid identified as $$\{CH_3[(CH_3)_2SiCH_2]_2SiCH_3O-\}_3$$

This compound has a boiling point of 252° C. at 25 mm., a refractive index of 1.4598 at 25° C., a density of 0.9208 at 25° C., and a specific refraction of 0.2972.

Example 3

A mixture of 80 parts by weight of $$(CH_3)_3SiCH_2SiCH_3(OC_2H_5)_2$$

63.98 parts of 95% $C_2H_5OH$, and 100.79 parts of 35% HCl was refluxed for 20 hours. The acid-aqueous alcohol layer was drawn off and the hydrolyzate washed with $H_2O$. The washings and the original water layer were extracted with benzene. The benzene extract was then filtered. Distillation yielded 21.05 parts of $$[(CH_3)_3SiCH_2SiCH_3O-]_3$$

and 23.48 parts of a fluid mixture of $$[(CH_3)_3SiCH_2SiCH_3O-]_4$$

and $$C_2H_5O[(CH_3)_3SiCH_2SiCH_3O]_3C_2H_5$$

Both of these compounds have a boiling point of 223° C. at 24 mm.

Example 4

82 parts by weight of $(CH_3)_3SiCH_2SiCH_3Cl_2$ and 100 parts of 10% $H_2SO_4$ were mixed and refluxed for 7 hours. The acid-water layer was drawn off and the hydrolyzate washed with $H_2O$, dried over anhydrous $Na_2SO_4$, and filtered. The filtrate was then distilled. 15 parts of $$[(CH_3)_3SiCH_2SiCH_3O-]_3$$

13 parts of $$[(CH_3)_3SiCH_2SiCH_3O-]_4$$

and 7.5 parts of $$[(CH_3)_3SiCH_2SiCH_3O-]_5$$

were obtained. This pentamer is a fluid having a boiling point of 270° C. at 25 mm., a refractive index of 1.4493 at 25° C., a density of 0.9303 at 25° C., and a specific refraction of 0.2885. There remained 13 parts of a high molecular weight non-volatile fluid polymer of the formula $$[(CH_3)_3SiCH_2SiCH_3O]_n$$

which contained cyclics of this formula in which $n$ had values up to 10.

Example 5

145 parts by weight of $$(CH_3)_2C_6H_5SiCH_2SiCH_3(OC_2H_5)_2$$

was shaken with water. The excess water was taken off. The hydrolyzate was washed several times with $H_2O$, thinned with benzene, and dried over anhydrous $Na_2CO_3$. The benzene was boiled off. The reaction mixture was refluxed for one hour. 70 parts of unreacted material was recovered by distillation, leaving 42 parts of product. This product was a mixture of compounds of the type $$[(CH_3)_2C_6H_5SiCH_2SiCH_3O-]_n$$

and had a refractive index of 1.3183 at 25° C., and a density of 1.0356 at 25° C., and contained cyclic compounds in which $n$ was equal to 3 and 4, as well as higher members.

Example 6

220 parts of $(CH_3)_3SiCH_2SiCH_3(OC_2H_5)_2$ was hydrolyzed by adding 36 parts by weight of water. The hydrolyzate was dissolved in benzene. The hydrolyzate was washed with 100 parts of $H_2O$, dried over $CaCO_3$, filtered and distilled. Distillation yielded two compounds of the formula $$[(CH_3)_3SiCH_2SiCH_3O-]_3$$

One had a boiling point of 177° C. at 25 mm., a refractive index of 1.4355 at 25° C., a density of 0.9111 at 25° C., and a specific refraction of 0.2865. The other had a boiling point of 183° C. at 25 mm., a refractive index of 1.4393 at 25° C., a density of 0.9180 at 25° C., and a specific refraction of 0.2865. These two compounds are the cis and trans isomers.

That which is claimed is:

1. Organosilicon polymers, the polymeric units of which consist of units of the type $$[R(R_2SiCH_2)_mSiRO-]$$

in which each R is a radical of the group consisting of alkyl and monocyclicaryl radicals and $m$ is an integer having a value of from 1 to 2 inclusive.

2. Polymers in accordance with claim 1 in which R represents methyl.

3. Polymers in accordance with claim 1 in which all of the R's are methyl and monocyclicaryl radicals and which polymers contain both methyl and monocyclicaryl radicals.

4. $[C_6H_5(CH_3)_2SiCH_2SiCH_3O-]_n$ in which $n$ has a value from 3 to 4 inclusive.

5. $[(CH_3)_3SiCH_2SiCH_3O-]_n$ in which $n$ has a value from 3 to 5 inclusive.

6. $\{CH_3[(CH_3)_2SiCH_2]_2SiCH_3O-\}_3$

7. The method which comprises hydrolyzing compounds of the type $R(R_2SiCH_2)_mSiRY_2$ in which each R is a radical of the group consisting of alkyl and monocyclicaryl radicals, $m$ is an integer having a value of from 1 to 2 inclusive, and Y is a substituent of the group consisting of alkoxy radicals and halogen atoms, and condensing the hydrolysis product thereof, whereby to obtain organosilicon polymers, the polymeric units of which are of the type $$[R(R_2SiCH_2)_mSiRO-]$$

8. The method in accordance with claim 7 in which only some of the R's are methyl radicals and the remainder are monocyclicaryl radicals.

9. The method in accordance with claim 7 in which all of the R's are methyl radicals.

JOHN T. GOODWIN, JR.

REFERENCES CITED

The following references are of record in the file of this patent:

Sommer: "Jour. Am. Chem. Soc.," vol. 69 (1947) page 980.

Goodwin: "Jour. Am. Chem. Soc.," vol. 69 (1947) page 2247.

Bluestein: "Jour. Am. Chem. Soc.," vol. 70 (1948) pages 3068–3071.

Certificate of Correction

Patent No. 2,527,808                                                     October 31, 1950

JOHN T. GOODWIN, Jr.

It is hereby certified that error appears in the printed specification of the above numbered patent requiring correction as follows:

Column 2, line 38, for "63.9 parts" read *63.98 parts*; line 45, for that portion of the compound reading "SiCH$_3$SiCH$_3$O—]$_x$" read SiCH$_3$O—]$_x$ column 3, line 59, for that portion of the compound reading "O]$_n$" read O—]$_n$; and that the said Letters Patent should be read as corrected above, so that the same may conform to the record of the case in the Patent Office.

Signed and sealed this 23rd day of January, A. D. 1951.

[SEAL]

THOMAS F. MURPHY,
                                                                                 *Assistant Commissioner of Patents.*